United States Patent [19]

Loshbough

[11] 3,770,069

[45] Nov. 6, 1973

[54] COMPUTER WEIGHER SYSTEM WITH INTERMEDIATE CALCULATION AND DISPLAY

[75] Inventor: Richard C. Loshbough, Temperance, Mich.

[73] Assignee: Reliance Electric Company, Toledo, Ohio

[22] Filed: Nov. 28, 1972

[21] Appl. No.: 310,029

[52] U.S. Cl.................... 177/1, 177/25, 177/DIG. 1, 177/DIG. 3, 235/61 PS, 235/151.33
[51] Int. Cl............................................. G01g 23/22
[58] Field of Search.................... 177/1, 25, DIG. 1, 177/DIG. 3; 235/58 PS, 61 PS, 151.33

[56] References Cited
UNITED STATES PATENTS

| | | | |
|---|---|---|---|
| 3,608,655 | 9/1971 | Ray et al................................. | 177/1 |
| 3,439,760 | 4/1969 | Allan........................... | 235/58 PS X |

Primary Examiner—George H. Miller, Jr.
Attorney—Thomas H. Grafton

[57] ABSTRACT

An improved control for an electronic computing scale which computes, for example, the value of an article based upon a predetermined price per unit weight for the article. The weight of the article is multiplied times the predetermined price to obtain the article value which is displayed on a visual readout device. The weight used in computing the value is stored in a memory. The weight of the article is periodically measured and compared with the stored weight. A new value is computed only when a measured weight differs from the weight stored in the memory. The memory is cleared if the predetermined price is changed or the article is removed from the scale. In addition to the value, the predetermined price and the weight stored in the memory are displayed on visual readout devices.

16 Claims, 2 Drawing Figures

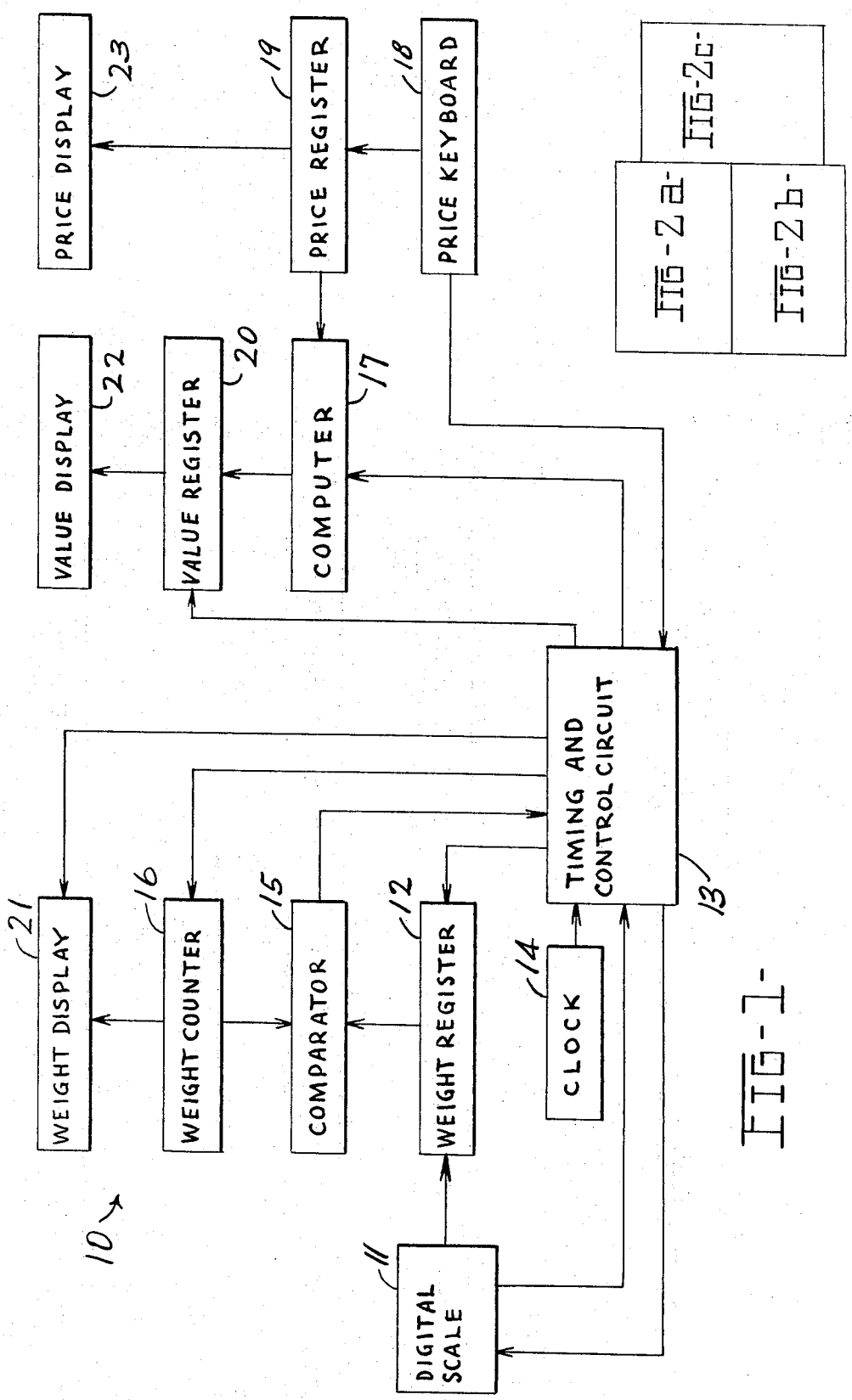

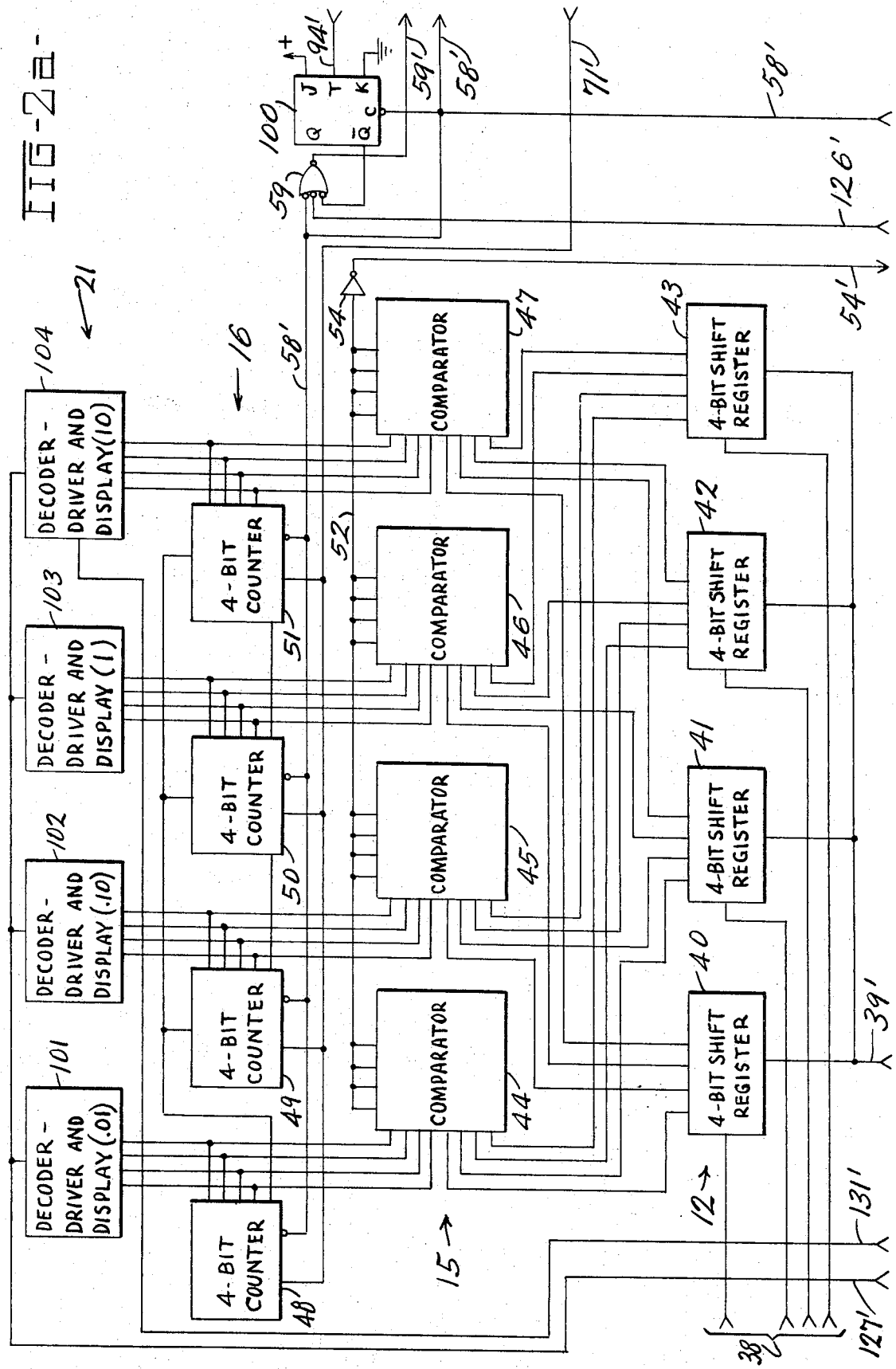

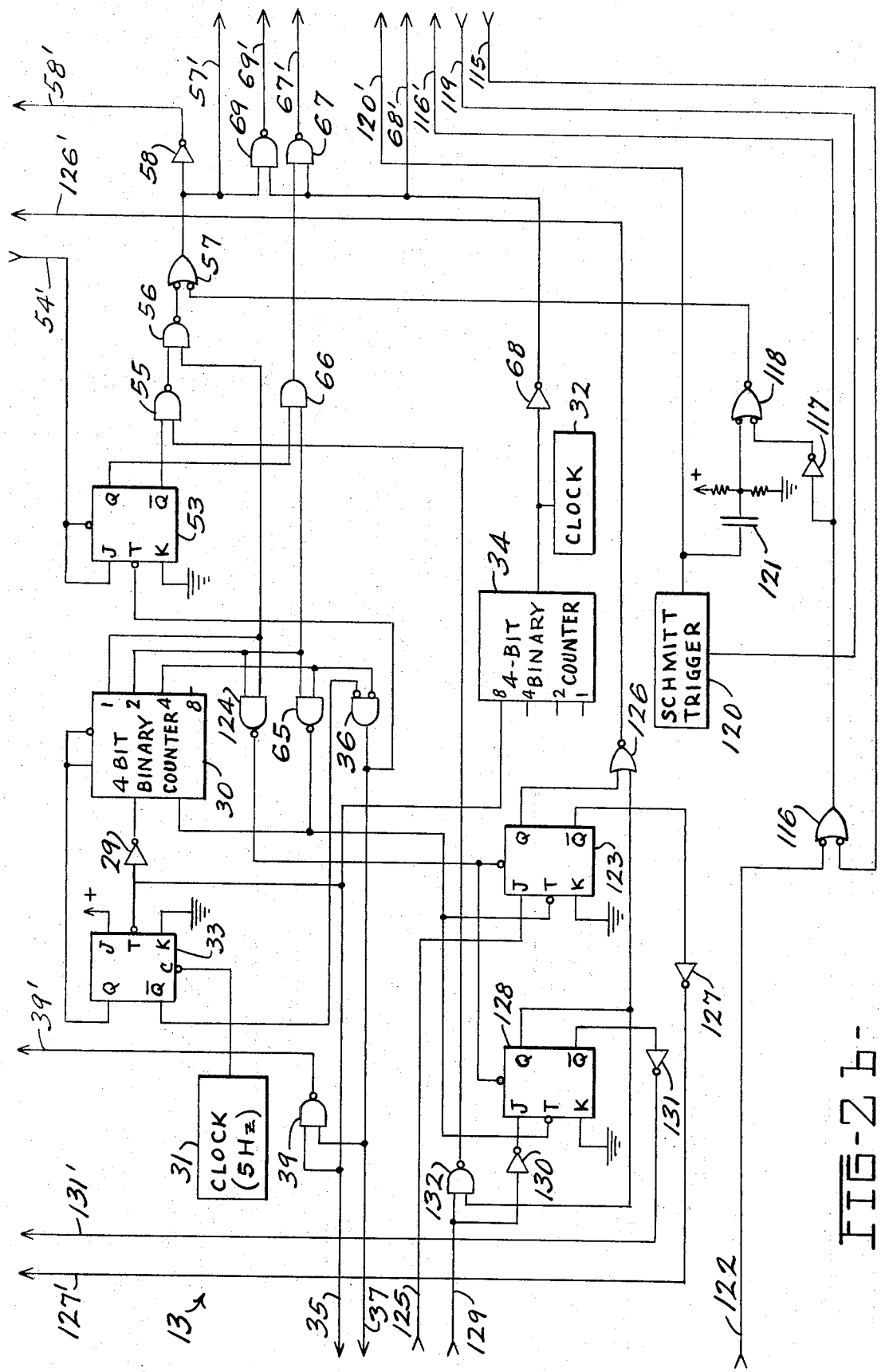

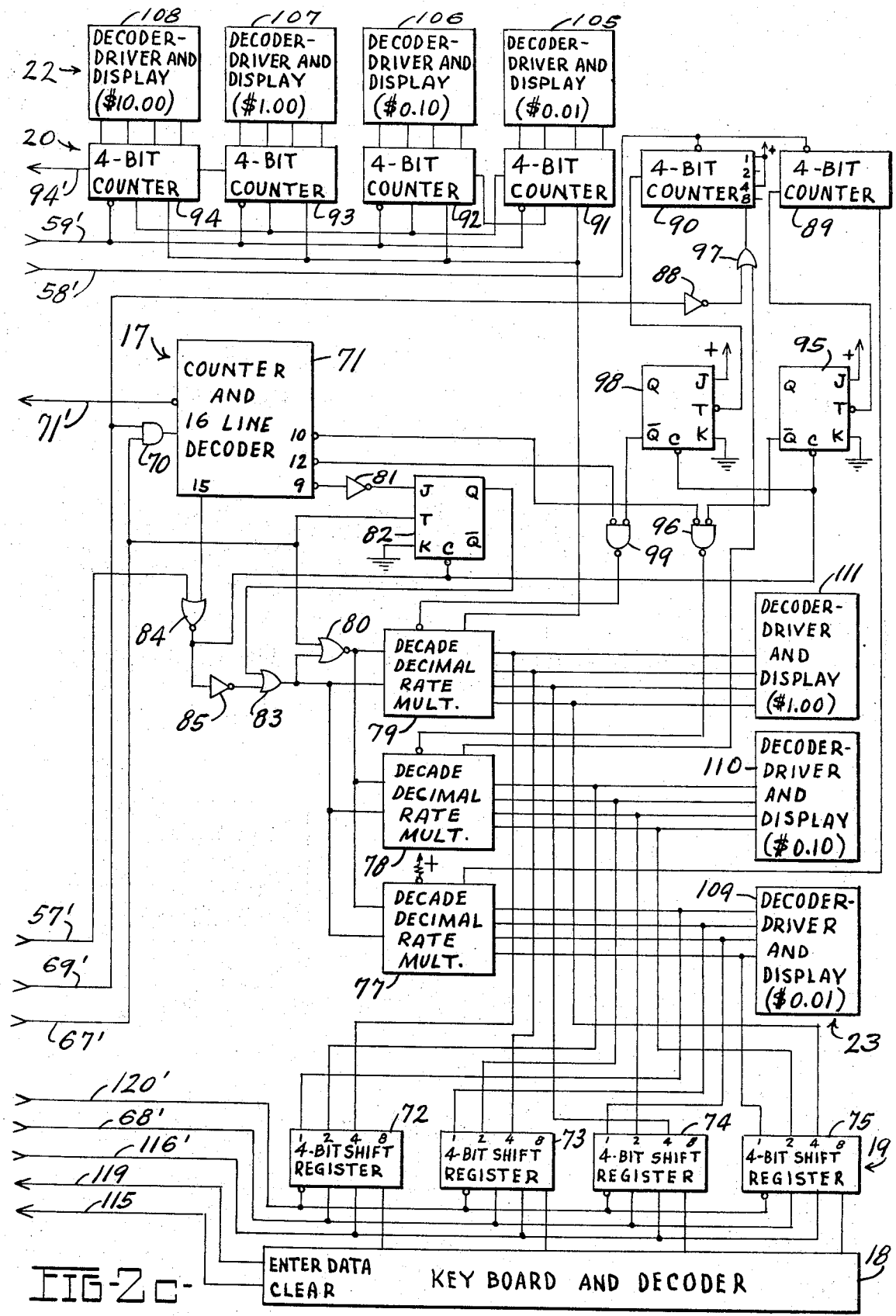
FIG-2c-

COMPUTER WEIGHER SYSTEM WITH INTERMEDIATE CALCULATION AND DISPLAY

BACKGROUND OF THE INVENTION

This invention relates to computing scales and methods and more particularly to an improved control for a scale which periodically weighs an article and either computes the value of the article based upon a predetermined price per unit weight or computes some other desired data from the article weight.

Computing scales are used in many industries for weighing articles and computing desired data from the article weight. Computing scales are, for example, commonly used in the retail food sales industry for weighing meats, produce and similar articles sold by weight and for computing from the article weight the value of such article based upon a predetermined price per unit weight. The article weight and the computed price are then displayed to the store clerk and to customers.

Computing scales are also used for obtaining data other than the value of articles. Such scales, for example, are sometimes used for obtaining a count of the number of pieces in a container. The scales weigh the number of pieces in the container and divide such weight by the average weight per piece for obtaining a piece count. Or the scales may be used for obtaining a net weight of a material having a known percentage, by weight, of impurities. For example, if it is known that a particular material has a moisture content of 2 percent by weight, it may be desired to multiply the reading of a weighing scale by 98 percent so that the net or dry weight of the material is indicated.

Computing scales have become very sophisticated and highly accurate with the development of digital computing techniques. Advanced computing scales convert the measured article weight into a digital format and multiply this weight by a price per unit weight or by some other factor in a digital computer. The product appearing at the computer output may then be displayed on a digital readout, such as a Nixie tube readout or a seven-segment readout. Although state of the art digital computers are fast, they do not, however, have a continuously updated output of the type available from analog computers which are generally less accurate. Since the output is not continuously updated, the computer must periodically multiply the article weight by the price to obtain an accurate value. Typically, the computed value is updated a few times per second since it would be expensive to provide an appreciably faster rate and a slower rate is inconvenient for the scale user. However, the relatively slow periodic updating of the computed value results in an objectionable blinking or blurring of the value and weight shown in the readout display. One proposed solution to this problem is to use buffer memories before the display. However, this solution is unpractical because of its expense.

SUMMARY OF THE INVENTION

According to the present invention, the value calculated by a digital computing scale is updated only when there is a change in the article weight or in the price per unit weight to prevent unnecessary blinking or blurring of the readout display. The computing scale is provided with a control which periodically cycles to read the weight of an article on a digital weight scale. Each reading of the article weight is compared with a weight stored in a memory. If the weights are equal, the cycle is terminated until the next periodic weight reading. If the weights are unequal or do not compare, the control causes the computer to calculate a new value based upon the current weight reading and this weight is stored in the memory for comparison with future weight readings and for displaying on a digital weight readout. The newly calculated value and the price from which it was calculated are also stored and displayed on digital readouts. The control clears the weight memory to initiate computation of a new value when the price is changed, when the article is removed from the scale and when the sign of the measured weight changes from negative to positive without a change in the absolute value of the weight.

Accordingly, it is a primary object of this invention to provide an improved control for computing scales.

Another object of this invention is to provide an improved method and apparatus for reducing blinking and blurring of a digital readout in a computing scale.

Other objects and advantages of the invention will become apparent from the following detailed description, with reference being made to the accompanying drawings.

BRIEF DESCRIPTION OF THE DRAWINGS

FIG. 1 is a schematic block diagram illustrating an improved electronic computing scale incorporating a control constructed in accordance with the present invention; and FIG. 2, consisting of FIGS. 2a, 2b and 2c, is a detailed logic diagram of a control and computer for an electronic digital computing scale constructed in accordance with the present invention.

DESCRIPTION OF THE PREFERRED EMBODIMENTS

Turning now to FIG. 1, a block diagram is shown for an improved electronic computing scale 10 embodying the principles of the present invention. The scale 10 is shown and described for computing and indicating the value of an article being weighed based upon a predetermined price per unit weight. However, it will be appreciated that by using a factor other than price, data other than value will be computed and indicated by the scale 10. If, for example, the reciprocal of the average weight of one of several pieces being weighed is multiplied times the total piece weight, the scale 10 will indicate a count of the total number of pieces being weighed. Or, the scale 10 may be used for obtaining a net weight of a material having a predetermined moisture content or other impurity by entering the net weight percentage into the scale computer in place of price.

Weight data is obtained by a conventional digital scale 11. The digital scale 11 may, for example, consist of a scale on which a shaft is rotated in proportion to the weight of an article placed on a platform. A Gray code chart may be rotated by the shaft. Optical sensors read the Gray code chart and this reading is converted to a binary coded decimal (BCD) output which is supplied to a weight register 12 in the computing scale 10. Or the digital scale 11 may consist of a load cell scale which generates an analog signal proportional to the weight placed upon one or more load cells. The analog signal is then applied to an analog-to-digital converter for generating a BCD digital weight output which is applied to the weight storage register 12.

The digital scale 11 is provided with two inputs from a timing and control circuit 13. When a weight reading is to be entered into the weight register 12, the timing and control circuit 13 enables the output of the digital scale 11 and then applies four clock pulses for serially shifting four BCD's into the weight register 12. In the following description, the four BCD's shifted into the weight register 12 will represent ten pounds, one pound, one-tenth pound and one-hundredth pound. However, it will be appreciated that other units of weight or additional units of weight also may be used. The digital scale 11 is provided with several outputs in addition to the weight outputs: an output is provided for indicating when the capacity of the digital scale 11 has been exceeded, an output is provided for indicating when the scale weight output is below zero or has a negative sign as when the scale 11 is compensated for a tare weight and no container or package is placed on the scale 11 and an output is provided for generating a pulse when the weight on the scale 11 drops below one-tenth pound on removal of an article being weighed. Since digital scales having inputs and outputs of this type are known and obvious to those skilled in the art, the digital scale 11 will not be discussed in further detail.

A clock 14 periodically causes the timing and control circuit 13 to cycle to enable the digital scale 11 and read into the weight register 12 four BCD weight digits corresponding to the weight of an article being weighed. Each time a new weight is entered into the register 12, a comparator 15 compares this weight with a weight stored in a memory or weight counter 16. If the weights in the register 12 and the weight counter 16 compare, the timing and control circuit 13 inhibits the calculation of a new value for the remainder of a control cycle. If, on the other hand, the two weights do not compare, the timing and control circuit 13 supplies a series of pulses to a computer 17.

A manual keyboard 18 is provided for entering into the computing scale 10 the price per pound of the article being weighed. The keyboard 18 may be of a conventional type, such as a 10-key keyboard of the type found on electronic adding machines. The keyboard 18 includes a decimal-to-BCD encoder such that the price data appears in a BCD format which is entered into a price register 19. For retail food sales, it may be assumed that the normal maximum price per pound is no more than $9.99. Therefore, the price register 19 normally will be adequate if it is capable of storing three BCD's corresponding to three digits of price. The price per pound stored in the register 19 is applied to the computer 17. The computer 17 generates an output corresponding to the product of the weight stored in the weight register 12 and the price per pound stored in the price register 19. This product is equal to the value of the article being weighed and is stored in a value register 20. At the same time the computer 17 is calculating a value for storage in the value register 20, the weight counter 16 is counted up to the weight stored in the weight register 12.

The electronic computing scale 10 is provided with three digital displays for visually indicating weight, price and value. A display 21 is connected to the weight counter 16 for indicating the weight stored in the weight counter 16. Similarly, a display 22 indicates the value of the article being weighed, as stored in the value register 20, and a display 23 indicates the price per pound of the article, as stored in the price register 19. During a cycle of the timing and control circuit 13 in which the contents of the weight register 12 and the weight counter 16 do not compare, the timing and control circuit 13 clears the weight counter 16 and the value register 20. These registers are also cleared in the event that a new price is entered into the price register 19 from the keyboard 18, or the keyboard 18 is cleared, or the output of the digital scale 11 drops below a predetermined low value, such as one-tenth pound, when the article being weighed is removed from the scale 11.

Referring now to FIG. 2, which consists of FIGS. 2a, 2b and 2c, detailed logic is shown for the electronic computing scale 10. To facilitate reading FIG. 2, the output of any element extending between two sheets of FIG. 2 is designated with the number of the element primed. For example, the output of gate 67 is designated 67' where it extends between FIGS. 2b and 2c.

A control counter 30 controls the overall cyclic operation of the electronic computing scale 10 in response to a clock 31 and a clock 32. The clock 31 generates relatively low frequency pulses for periodically recycling the control counter 30. It has been found, for example, that a 5 Hz. clock rate is satisfactory for updating the displayed article value up to five times per second. Each one-fifth second, the clock 31 clears a flip-flop 33. When cleared, the Q output of the flip-flop 33 disables and, at the same time, clears the control counter 30 for initiating a new cycle. The clock 32 has a relatively high frequency pulse output, for example, on the order of 1 mHz., which is applied through a divide-by-sixteen circuit 34 consisting of a 4-bit counter to set the flip-flop 33 shortly after it is cleared by the clock 31.

When the flip-flop 33 is set, the control counter 30 is again enabled for cycling. The intermediate frequency clock output of the counter 34 is applied on a scale clock output terminal 35 to clock data from the digital scale 11. At the same time, the clock output of the counter 34 is applied through an inverter 29 to count up the control counter 30. During the counts of zero through three at the outputs of the control counter 30, an AND gate 36 will also apply a signal on an enable output 37 for reading the output of the digital scale 11. When scale 11 is enabled by a signal on the enable output 37, four clock pulses appearing on the scale clock output 35 clock the four BCD weight digits into the weight register 12 on four weight data lines 38. At the same time, a NAND gate 39 having inputs connected to the scale clock output 35 and the enable output 37 shifts the weight data into the weight register 12.

The weight register 12 consists of four 4-bit shift registers 40–43. The one's bit for each of the four BCD's is stored in the register 40, the two's bit for each of the BCD's is stored in the register 41, the four's bit for each of the BCD's is stored in the register 42 and the eight's bit for each of the BCD's is stored in the register 43. The outputs of the registers 40–43 are applied to compare circuits 44–47 for comparison with the corresponding bits of the BCD's stored in the weight counter 16. The weight counter 16 consists of four 4-bit decoder counters 48–51. The outputs of the counters, as previously stated, are applied to the comparator circuits 44–47, respectively. The comparators 44–47 have a common output 52 which goes to a high or logic one state upon coincidence of the contents of the registers 40–43 and the counters 48–51.

As indicated above, the weight output from the digital scale 11 is read into the shift registers 40–43 during the counts of zero through three of the control counter 30. On a count of four, and succeeding counts, the AND gate 36 will apply a signal on the output 37 for inhibiting an output from the digital scale 11 and for inhibiting the gate 39 from shifting the registers 40–43. The change in output of the AND gate 36 also triggers a coincidence flip-flop 53. The output 52 from the comparator 15 is connected through an inverter 54 to the clear and the J inputs of the flip-flop 53. If the weight stored in the weight register 12 compares identically to the weight stored in the weight counters 16, the flip-flop 53 will remain in a cleared state with a high $\overline{Q}$ output. However, if there is no coincidence, the flip-flop 53 will be set and the $\overline{Q}$ output of the flip-flop 53 will change the output of a NAND gate 55 which is in turn applied to a NAND gate 56. On a count of five, the output of the gate 56 will be changed. This output is applied through an OR gate 57 and an inverter 58 for forming a "main reset" signal which clears the 4-bit counters 48–51 of the weight counter 16 and clears and presets for roundoff a portion of the value counter 20. The main reset signal is also applied through an OR gate 59 for clearing the remaining portion of the value counters 20, as will be discussed in detail below.

As the control cycle continues, the control counter 30 is counted up to a total count of six. On a count of six, a NAND gate 65 will disable further counting by the control counter 30. The control counter 30 will also apply a signal to an AND gate 66 which enables the computer 17. If there has been weight coincidence, the AND gate 66 will have no output and the cycle is terminated until the control counter 30 is cleared by the clock 31 to initiate a new cycle. If the flip-flop 53 was set on count four in response to a lack of coincidence, the AND gate 66 will have an output which enables a NAND gate 67. The output of the clock 32 is connected through an inverter 68 to the gate 67. Clock pulses pass through the enabled gate 67 to the computer 17, as will be discussed in detail below. The output of the inverter 68 is also applied through a NAND gate 69 to the computer 17. The NAND gate 69 is enabled by the output of the OR gate 57 when the flip-flop 53 is set. Simultaneous clock outputs are required from both gates 67 and 69 for operating the computer 17.

The clock outputs of the NAND gates 69 and 67 are connected through an AND gate 70 to count up a counter and sixteen-line decoder 71 in the computer 17. The counter and decoder 71 may comprise an integrated circuit such as a type 74161 TTL counter connected to a type 74155 TTL decoder/demultiplexer or it may consist of any other suitable element having outputs on counts of nine, ten, twelve and fifteen out of every cycle. The nine, ten, twelve, fifteen and "carry" outputs of the counter and decoder 71 are used for controlling multiplication by the computer 17. The counter and decoder 71 is cycled by the clock output of the AND gate 70 once for each unit of the weight stored in the weight register 12. The "carry" output of the counter and decoder 71 is connected to count up the weight counter by one on each cycle of 16 pulses from the clock 32. When the weight counter 16 is counted up to coincidence with the weight register 12, the coincidence flip-flop 53 is cleared thereby inhibiting the passage of clock pulses through the NAND gates 67 and 69 and the AND gate 70 to the counter and decoder 71.

The price data is supplied to the computer 17 from the price register 19. The price register 19 is shown as consisting of four 4-bit shift registers 72–75. BCD price data is serially shifted from the keyboard and decoder 18 into the shift registers 72–75 over four data lines 76. Since there are only three price digits in the embodiment of the computing scale 10 described herein, only three outputs of the shift registers 72–75 are used. The three outputs of the register 72 are the one's bit for each of the three digits, the three outputs of the register 73 are the two's bit, the three outputs of the register 74 are four's bit and the three outputs of the register 75 are the eight's bit.

The three price BCD's are applied, respectively, to three decade-decimal rate multipliers 77–79, with the $.01 digit applied to the multiplier 77, the $.10 digit applied to the multiplier 78 and the $1.00 digit applied to the multiplier 79. The decade-decimal rate multipliers are commercially available units such as Texas Instrument type 74167 TTL integrated circuits. The output of each multiplier 77–79 is equal to one-tenth the input number from the price registers 72–75 times the pulse input applied to the multipliers 77–79 from a NOR gate 80. The NOR gate 80 receives clock pulses over the line 67' from the NAND gate 67 during the multiplication cycle. Since no pulse is required for a "zero," nine clock pulses are passed through the NOR gate 80 during each cycle of the counter and decoder 71.

When the counter and decoder 71 reaches a count of nine, the "nine" output is applied through an inverter 81 to set a flip-flop 82 when triggered by the next clock pulse on the line 67'. When the flip-flop 82 is set, an OR gate 83 inhibits the passage of clock pulses through the NOR gate 80 to the multipliers 77–79 and also disables the input to the multipliers 77–79. Further counting of the multipliers 77–79 is inhibited until the counter and decoder 71 completes a cycle. At the completion of a cycle of the counter and decoder 71 at a count of fifteen, a NOR gate 84 clears the flip-flop 82 to reinstate the input to the multipliers 77–79. An inverter 85 also connects the output of the NOR gate 84 to the OR gate 83 for preventing the multipliers 77–79 from being counted up simultaneously as the flip-flop 82 is cleared on a fifteen count. Thus, it will be apparent that the clock pulse input to the multipliers 77–79 is ten times the clock pulse input to the weight counters 16. This is to compensate for the fact that the commercial multipliers 77–79 used in the computer 17 divide the output by a factor of 10.

The value counter 20 consists of six 4-bit decoder counters 89–94. The contents of the counter 89 is equivalent to $.0001; the contents of the counter 90 is equivalent to $.001; the contents of the counter 91 is equivalent to $.01; the contents of the counter 92 is equivalent to $.10; the contents of the counter 93 is equivalent to $1.00; and the contents of the counter 94 is equivalent to $10.00. The value counter 89 is initially cleared by the main reset output line 58' from the inverter 58 and the counters 91–94 are cleared by the output 59' of the OR gate 59. The main reset line 58' is also connected to the "load" or "preset" terminal of the counter 90. The binary input to the counter 90 is wired for presetting the counter 90 to five or in monetary value to $.005 for rounding off the value of the nearest cent. In addition to a signal on the "load" terminal, the counter 90 must be clocked through at least one cycle.

The output of the decimal-decade rate multiplier 77 is applied to count up the counter 89. The counter 89, and the other counters 90–94, are of the decade type and have, in addition to a binary BCD output, a carry output on a count of ten. The carry output of the counter 89 sets a flip-flop 95 which was previously cleared by the output of the NOR gate 84, at the same time the flip-flop 82 was cleared. When the counter 89 is counted up by more than ten and the carry output sets the flip-flop 95, a pulse passes through an AND gate 96 to a "carry" input to the multiplier 78 on the ten count of the counter and decoder 71. The carry input of the multiplier 78 is applied to the multiplier output through an internal OR circuit. The output of the multiplier 78 passes through an OR gate 97 to clock the counter 90 of the value register 20. The controlled clock output 69' of the gate 69 is also applied through an inverter 88 to the OR gate 97 to preset the counter 90 when the counters 89 and 91–94 are cleared. When the counter 90 has cycled, the "carry" output is used to set a flip-flop 98. The output of the flip-flop 98 is applied through an AND gate 99 to the "carry" input of the decade-decimal rate multiplier 79 on a count of twelve by the counter and decoder 71. The output of the multiplier 79 counts up the remaining counters 91–94 of the value counter 20. As previously indicated, the counting operation continues until weight coincidence clears the flip-flop 53. At this time, clock pulses to the counter and decoder 71 cease and the value stored in the counters 91–94 corresponds to the value to the nearest cent of the article on the digital scale 11.

For most retail food sales, the value will not exceed $99.99. If this value should be exceeded, the carry output 94' of the most significant digit counter 94 will set a flip-flop 100. The Q̄ output of the flip-flop 100 is applied through the OR gate 59 to clear the value counters 91–94 in response to setting the flip-flop 100, thereby preventing the display of an erroneous value.

The computing scale 10 includes a display panel for displaying weight, value and price information to an operator. The weight of an article on the digital scale 11 is displayed on the weight display 21 which consists of four decoder-driver and display units 101–104. The display unit 101 has an input from the weight counter 48 and indicates 0.01 pound units; the display unit 102 has an input from the weight counter 49 and indicates 0.1 pound units; the display unit 103 has an input from the weight counter 50 and indicates one pound units; and the display unit 104 has an input from the weight counter 51 and indicates ten pound units. The value display 22 also consists of four decoder-driver and display units 105–108 with the display unit 105 having an input from the value counter 91 for indicating value in $.01 units, the display unit 106 having an input from the counter 92 for indicating value in $.10 units, the display unit 107 having an input from the counter 93 for indicating value in $1 units and the display unit 108 having an input from the counter 94 for indicating value in $10 units. Finally, the price stored in the price register 19 is displayed on the price display 23 which consists of a decoder-driver and display unit 109 for indicating price in $.01 units, a decoder-driver and display unit 110 for indicating price in $.10 units and a decoder-driver and display unit 111 for indicating price in $1 units.

It will be appreciated that the decoder-driver and display units 101–111 may be of any conventional design. They may, for example, consist of an integrated circuit BCD-to-seven segment decoder-driver and a seven segment display device. Or, the units 101–111 consist of a BCD-to-decimal decoder-driver and a ten digit display such as a Nixie tube.

It is of a primary concern that erroneous weight and value data cannot be displayed on the weight display 21 or the value display 22, respectively. A number of interlocks are provided for preventing erroneous displays. As previously indicated, the value counters 91–94 are cleared by the flip-flop 100 and the OR gate 59 if the capacity of these counters is exceeded. Thus, if an article has a value over $99.99, such as $124.34, the counters 91–94 will be cleared rather than storing and causing an indication of an erroneous value of $25.34.

It is also desirable to prevent an erroneous price indication in the event that either the price register 19 is cleared or new price data is entered into the price register 19 without a change in the article weight and also when an article being weighed is removed from the digital scale 11. If a clear button is pushed on the keyboard 18, a "clear" output 115 applies a signal through an OR gate 116 to a left-right shift mode input to the price shift registers 72–75 to cause the next four clock pulses on the clock line 68' to empty the shift registers 72–75. The output of the OR gate 116 is also applied through an inverter 117 and an OR gate 118 to the OR gate 57. This causes the OR gate 57 and the inverter 58 to generate a main reset signal on the main reset line 58', thereby clearing the weight counters 16 and the value counters 89 and 91–94 and presetting the value counter 90 to five for round off of the next computed value. These counters are also cleared or preset in a similar manner when new data is entered into the price shift registers 72–75. Each time a BCD is entered into the registers 72–75, the keyboard 18 generates an "enter data" output 119 which triggers a Schmitt trigger 120. When the Schmitt trigger 120 is triggered, a pulse passes through a capacitor 121, the OR gate 118, the OR gate 57 and the inverter 58 for applying a signal on the main reset line 58'. The output 120' of the Schmitt trigger 120 is also applied to the right shift input of the price registers 72–75 for shifting a price digit in a BCD format from the keyboard and decoder 18 into the price registers 72–75.

As previously mentioned, the digital scale 11 which weighs the article being priced is designed to generate a pulse each time the output of the scale 11 drops through a predetermined low limit, such as one-tenth pound, as a consequence of the article being removed from the digital scale 11. This pulse is applied by the digital scale 11 on a line 122 to the OR gate 116 for auomatically clearing the price register 19, the weight register 16 and the value register 20 in the same manner in which these registers are cleared by a "clear" output 115 from the keyboard 18. Thus, price data may be entered into the computing scale 10 through the keyboard 18 either before or after an article is placed upon the digital scale 11. When the article is placed upon the digital scale 11 and the price is entered, a value is computed and displayed. After the value is computed and displayed, the weight, price and value registers are cleared upon removal of the article from the digital scale 11. This interlock prevents an erroneous value indication if a careless operator forgets to enter a new price when weighing articles having different prices per pound.

It is also desirable to have an interlock to prevent erroneous value and weight displays when the maximum weight capacity of the digital scale 11 is exceeded. A flip-flop 123 is provided as a memory for storing information on whether or not the capacity of the digital scale 11 is exceeded. On a count of three from the control counter 30, a NAND gate 124 clears the flip-flop 123. The digital scale 11 is provided with an overcapacity output 125 connected to the J input of the flip-flop 123. If the capacity of the scale is exceeded, the flip-flop 123 will be set by the NAND gate 65 on a count of six from the control counter 30. When the flip-flop 123 is set, a NOR gate 126 changes the output of the OR gate 59 for clearing the value counters 91–94, thereby preventing an erroneous value indication. Setting of the flip-flop 123 also applies a signal through an inverter 127 to blank the weight decoder-driver and display units 101–104. Thus, with all weight digits blanked, a user of the computing scale 10 will realize that the weight capacity of the scale 10 has been exceeded.

A final interlock is provided for indicating on the weight display 21 a negative sign when the weight on the digital scale 11 is below zero and also for inhibiting a value display when the weight is below zero. Many commercial digital scales 11 of the type suitable for use with the herein described computing scale 10 include a tare provision. The digital scale 11 may be initially set to read below zero by an amount equal to the tare weight of a package or container which holds the article being priced. If no articles are placed on the digital scale 11, it may be desirable to indicate the negative value of the tare weight, even though it would not be desirable to calculate a value based upon this negative weight.

A flip-flop 128 is provided for controlling the sign of the weight stored in the weight counters 48–51. The flip-flop 128 is initially cleared on a count of three of the control counter 30 by the NAND gate 124 at the same time the flip-flop 123 is cleared. The digital scale 11 is provided with a sign output 129 which changes logic states when going between below zero and above zero weight readings. The sign output 129 of the scale 11 is applied through an inverter 130 to the J input of the flip-flop 128. On a count of six by the control counter 30, the NAND gate 65 triggers and sets the flip-flop 128 when the weight on the scale 11 is below zero. The tare weight will normally be small and always less than ten pounds when the scale 10 is used for retail food sales. Therefore, the weight display 104 is used for displaying a minus sign. As long as the flip-flop 128 is set, an inverter 131 applies a signal to the display 104, causing this display to indicate the minus sign. At the same time, the flip-flop 128 applies a signal to the NOR gate 126 to clear the value counters 91–94, thereby preventing a meaningless value display.

Since the timing and control circuit 13 looks for a comparison between the weights stored in the weight register 12 and the weight counter 16, provision must be made for initiating a new value computation in the event that the scale goes from a negative weight to a positive weight of the same magnitude. Thus, if the digital scale 11 is preset to a negative value for a one-half pound tare weight and an article in a container having a total weight of one pound is placed upon the digital scale 11, the weight register 12 will continue to read one-half pound resulting in coincidence even though the signal has gone from a negative value to a positive value. Therefore, the below zero output 129 of the scale 11 and the Q output of the sign flip-flop 128 are connected through a NAND gate 132 to the NAND gate 55. A change in sign in the output of the digital scale 11 without a change in weight magnitude will result in a pulse on the main reset line 58' to clear the weight counter 16 and the value counter 20. A new value will then be computed on the next cycle of the control counter 30.

It will be appreciated by those skilled in the art that various changes and modifications may be made to the above-described electronic computing scale 10 without departing from the invention. It will, of course, be appreciated that the computer 17 may be of various commercial designs and may, for example, use a partial product method of multiplication. In addition, the computer 17 may provide other mathematical computations, such as division, for computing other data based upon an article weight and a weight related factor other than price per pound. If, for example, a weight factor which is equal to the average piece weight of several pieces on the digital scale 11 is entered into the register 19 and the computer 17 is adapted to divide the weight on the digital scale 11 by the piece weight in the register 19, then the display 22 will indicate a count of the number of pieces on the digital scale 11. Furthermore, it will be appreciated that the design of the digital scale 11 and the keyboard 18 may be varied, as well as the format in which data is supplied from the digital scale 11 and the keyboard 18. Various other changes and modifications may also be made without departing from the spirit and the scope of the claimed invention.

What I claim is:

1. An improved computing scale which displays desired data calculated from a predetermined weight factor for an article and a measured weight of such article comprising, in combination, means for periodically measuring the weight of the article, computing means for calculating the desired data from such measured weight and the weight factor, memory means for storing such calculated data until new data is calculated, means for displaying the data stored in said data memory means, and means for inhibiting said computing means from calculating new data when a measured weight is the same as the immediately preceding measured weight.

2. An improved computing scale, as set forth in claim 1, wherein said inhibiting means includes memory means for storing the measured weight from which the stored data was calculated, means for comparing each periodic measured weight with such weight stored in said weight memory means, means for causing said computing means to calculate new data from any periodic measured weight which differs from such stored weight, and means for storing in said weight memory means any periodic measured weight which differs from such stored weight.

3. An improved computing scale, as set forth in claim 2, and including means for displaying the article weight stored in said weight memory means.

4. An improved computing scale, as set forth in claim 3, wherein said weight measuring means has a maximum weight capacity, and including means for blanking at least a portion of said weight displaying means when such maximum weight capacity has been exceeded.

5. An improved computing scale, as set forth in claim 2, wherein said weight measuring means has a maximum weight capacity, and including means for clearing said data memory means when such maximum weight capacity has been exceeded.

6. An improved computing scale, as set forth in claim 2, and including means for clearing said weight memory means when the article is removed from said weight measuring means.

7. An improved computing scale, as set forth in claim 2, and including means for clearing said weight memory means in response to a change in successive weight measurement from a negative value to a positive value.

8. An improved computing scale, as set forth in claim 2, and including memory means for storing the predetermined weight factor, means for changing the stored weight factor, and means responsive to a change in the stored weight factor for clearing both said weight memory means and said data memory means.

9. An improved computing scale, as set forth in claim 2, wherein said data memory means has a maximum memory capacity, and including means for clearing said data memory means in response to calculated data exceeding such maximum memory capacity.

10. A method for calculating and displaying the value of an article having a predetermined price per unit weight comprising the steps of: periodically measuring the weight of the article; comparing each successive measured weight with a weight stored in a weight memory; in the event that any measured weight differs from the stored weight, calculating a new value from such measured weight and the predetermined price per unit weight; displaying the most recent calculated value; and storing in said weight memory the measured weight from which such displayed value was calculated.

11. A method for calculating and displaying the value of an article having a predetermined price per unit weight, as set forth in claim 10, and including the step of clearing said weight memory when the article exceeds a predetermined maximum weight.

12. A method for calculating data based upon the weight of an article and a weight factor, comprising the steps of: storing the weight factor in a memory; periodically measuring the weight of the article; comparing each successive measured weight with a weight stored in a weight memory; in the event that any measured weight differs from the stored weight, calculating new data from such measured weight and the stored weight factor; storing the most recent calculated data in a memory; displaying the stored data; and storing in said weight memory the measured weight from which such displayed data was calculated.

13. A method for calculating data based upon the weight of an article and a weight factor, as set forth in claim 12, and including the step of clearing said weight memory each time a new weight factor is stored in said weight factor memory.

14. A method for calculating data based upon the weight of an article and a weight factor, as set forth in claim 12, and including the step of clearing said weight and data memories whenever a measured weight exceeds a predetermined maximum weight.

15. A method for calculating data based upon the weight of an article and a weight factor, as set forth in claim 12, and including the step of clearing said data memory whenever the calculated data exceeds a predetermined maximum limit.

16. A method for calculating data based upon the weight of an article and a weight factor, as set forth in claim 12, and including the step of clearing said weight, weight factor and data memories whenever successive measured weights drop below a predetermined low level.

* * * * *